UNITED STATES PATENT OFFICE.

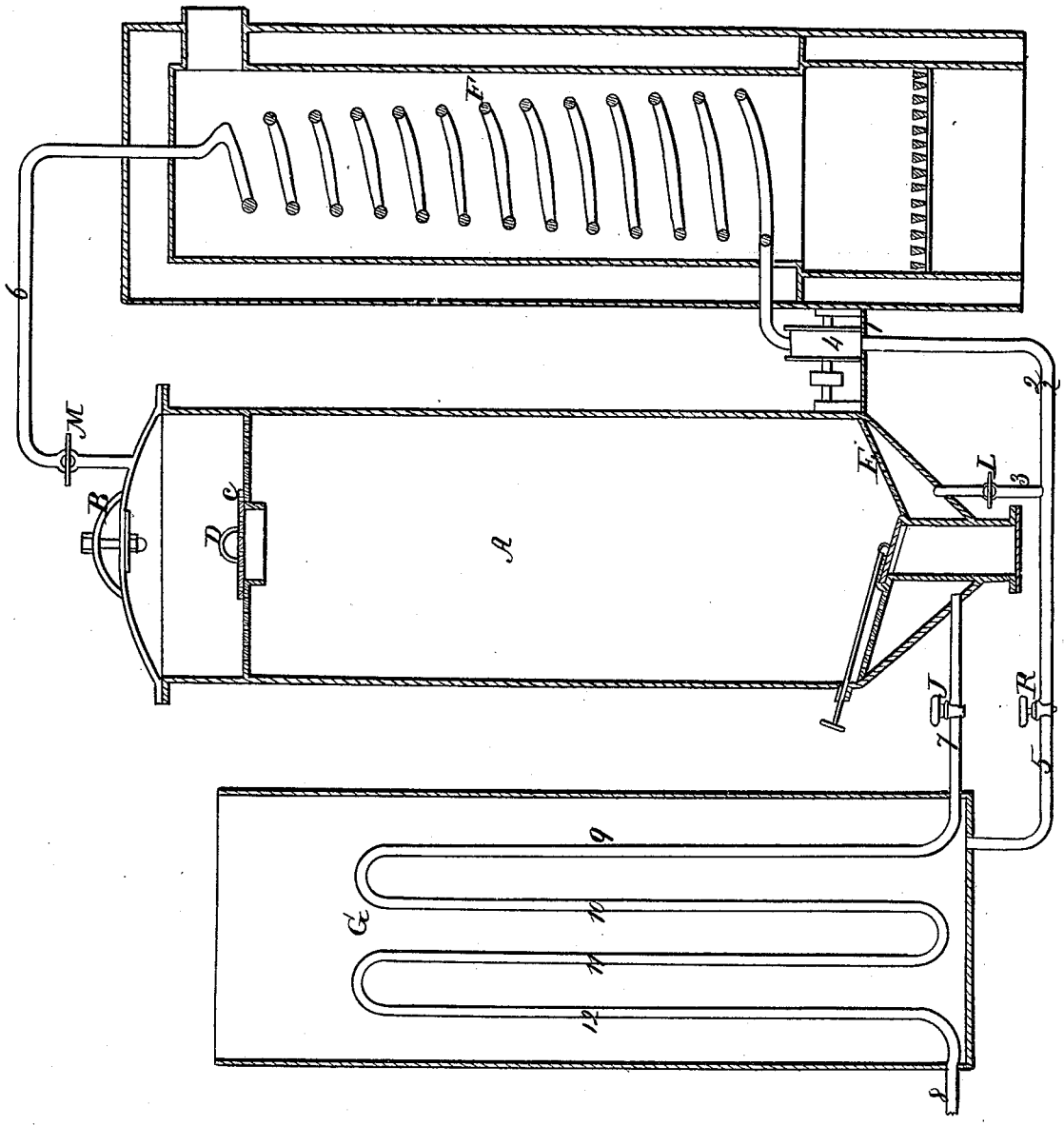

JOHN W. DIXON, OF PHILADELPHIA, PENNSYLVANIA.

IMPROVED APPARATUS FOR THE MANUFACTURE OF PAPER-PULP.

Specification forming part of Letters Patent No. 51,431, dated December 12, 1865.

*To all whom it may concern:*

Be it known that I, JOHN W. DIXON, of the city of Philadelphia and State of Pennsylvania, have invented a new and useful Improvement in Apparatus for Making Paper-Pulp from Vegetable Fibrous Material; and I do hereby declare the following to be a full and exact description of the same, reference being had to the annexed drawing, making a part of this specification, which represents a vertical section of my improved apparatus.

The object of my improvement is intended to carry out the process of forcing highly-heated water under pressure to circulate through the mass of vegetable fibrous matter to be pulped, and by such circulation of that material, as a dissolving agent, cause it to permeate the mass entirely and reduce the material to the state of pulp, and also to secure a frequent and rapid renewal of circulating fresh water, highly heated and under pressure, for the purpose of more effectually acting upon and dissolving the glutinous and other matters contained in the vegetable matters usually used for making pulp, such as wood, straw, &c.

A represents the pulp-digester, which is a boiler made of strong iron, (capable of resisting a pressure of from one hundred to three hundred pounds,) say four feet diameter and twelve feet high. It is furnished with a man-hole cover, B, and a perforated diaphragm, C, with a central removable cover, D, and a lower perforated diaphragm, E, with a sliding valve, as described fully in a former application for patent made by me.

F is a conical coil built in a furnace, and connecting at its lower extremity with the lower part of the pulp-digester A by means of the tubes 1, 2, and 3. At 4 a rotary pump is placed in the course of this tube. The upper part of the coil F is connected at the tube 6 with the interior of the digester A at its top.

G is an iron or wooden tank—say five feet diameter and ten or twelve feet high. The tube 7 passes from the lower part of the digester A through the walls of the tank G, and thence coils up and down a number of times in that tank, and passes out through the wall of the tank at 8. The interior of the tank is connected by the tube 4 with the tube 2 and the pump.

The operation of this apparatus is as follows: The digester A is to be filled with the vegetable fibrous matter to be pulped through the man-hole B. The cocks J and K are closed and the cocks L and M opened. A fire is made under the coil F, and the digester and coil are filled with fresh water. Fire is then applied under the coil F, and maintained until the desired pressure—say from eighty pounds to two hundred and fifty pounds or three-hundred pounds—is obtained, according to the nature of the substance to be acted upon. The pump 4 is then started and made to circulate the highly-heated water from the bottom of the digester through the heating-coil F into the top. After this liquid has circulated some time the cock L is to be closed and the cock J is opened. Thus the liquid will pass through the coil of pipe 9 and 10, 11, 12, and escape at 8. The tank is filled up with fresh water, which is heated by the liquid passing through the coil. The cock K being opened, the water thus heated in the tank passes on through the tubes 5 and 2 into the pump 4 and the coil F, and into the top of the digester A. By this means the water filled with gummy and other matters can be freely removed and its temperature imparted to a fresh supply of water as it passes out. After the contents of the boiler have been thus changed the cocks J and K are to be closed and the cock L opened, whereupon the circulation produced by the pump will be resumed, as at the first, from the bottom to the top of A, and so continued until the liquid becomes again surcharged with the gummy matter.

By this means the vegetable material can be pulped without mechanical aid in from six to twelve hours, depending on the material operated on and the pressure used.

Good results with this apparatus can be obtained with cornstalks or straw at one hundred and twenty-five pounds pressure, and perhaps less. With wood and other harder materials it would be preferable to use a higher pressure—say one hundred and fifty to three hundred pounds—to expedite the process.

Having thus described my invention, what I claim as my improvement is—

1. The combination of the paper-pulp digester and the heating-chamber, in which the refuse liquid escaping from the digester is made to heat the fresh liquid to be forced into the digester.

2. The combination of the paper-pulp digester, the pump for circulating the digesting-liquid, and the coil F for heating the liquid while circulating, and the chamber for heating the fresh liquid by the escaping refuse liquid, arranged and operated substantially as described.

In witness whereof I have hereunto set my hand and seal this 22d day of November, A. D. 1865.

JOHN W. DIXON. [L. S.]

Witnesses:
GEO. BUCKLEY,
WM. M. HARDING.